United States Patent [19]
Doddington

[11] Patent Number: 5,345,535
[45] Date of Patent: Sep. 6, 1994

[54] SPEECH ANALYSIS METHOD AND APPARATUS

[76] Inventor: George R. Doddington, 910 St. Lukes Dr., Richardson, Tex. 75080

[21] Appl. No.: 92,654

[22] Filed: Jul. 14, 1993

Related U.S. Application Data

[63] Continuation of Ser. No. 916,796, Jul. 17, 1992, abandoned, which is a continuation of Ser. No. 505,085, Apr. 4, 1990, abandoned.

[51] Int. Cl.$^5$ .......................... G01L 7/08; G01L 9/18
[52] U.S. Cl. ................................. 395/2.45; 395/2.49
[58] Field of Search ............... 395/2, 2.4, 2.45–2.5; 381/41–50

[56] References Cited

U.S. PATENT DOCUMENTS

| | | | |
|---|---|---|---|
| 4,032,711 | 6/1977 | Sambur | 381/42 |
| 4,669,120 | 5/1987 | Ono | 381/40 |
| 4,716,592 | 12/1987 | Ozawa et al. | 381/40 |
| 4,724,535 | 2/1988 | Ono | 381/31 |
| 4,741,036 | 4/1988 | Bahl et al. | 395/2 |
| 5,072,452 | 12/1991 | Brown et al. | 381/43 |

OTHER PUBLICATIONS

Nahamoo, *Clustering Acoustic Prototypes With Self Organizing Distortion Measures*, Apr. 7, 1986, vol. 1, Int'l Conf. on Acoustics Speech & Signal Processing, Tokyo, Japan, pp. 753–754.

Class, et al., *Speaker Adaptation for Recognition Systems With a Large Vocabulary*, Apr. 11, 1989, Mediterranean Electrotechnical Conf. Melecon' 89, Lisbon, Sec. 2.1, 2.3, pp. 241–243.

Wang, Ren-Hua, et al., *A Weighted Distance Measure Based on the Fine Structure of Feature Space: Application to Speaker Recognition*, Apr. 3, 1990, vol. 1, Int'l Conf. on Acoustics Speech & Signal Processing, Albuquerque, N. Mex., USA, pp. 273–276 (Sec. 2-pp. 273–274).

Velius, G., *Variants of Cepstrum Based Speaker Identity Verification*, Apr. 11, 1988, vol. 1, Int'l Conf. on Acoustics Speech & Signal Processing, New York, USA, pp. 583–586 (Sec. 5,6-pp. 584–585).

Tohkura, *A Weighted Cepstral Distance Measure for Speech Recognition*, Apr. 7, 1989, vol. 1, Int'l Conf. on Acoustics Speech & Signal Processing, Tokyo, Japan, pp. 761–764 (Sec. 2, 3.3, Exp. II, III).

Lleida, et al., *Feature Selection Through Orthogonal Expansion in Isolated Word Recognition*, Apr. 11, 1989, Mediterranean Electrotechnical Conf. Melecon 89, Lisbon, Sec. 2, p. 254.

IEEE "A Weighted Cepstral Distance Measure for Speech Recognition" (Apr., 1986, pp. 761–764) by Yoh ichi Tohkura.

IEEE "On The Use of Bandpass Liftering in Speech Recognition" (Apr., 1986, pp. 765–768) by B. H. Juang, L. R. Rabiner and J. G. Wilpon.

IEEE "A Frequency-Weighted Itakura Spectral Distortion Measure and Its Application To Speech Recognition in Noise" (Jan., 1988, pp. 41–48) by Frank K. Soong and Man Mohan Sondhi.

IEEE "A Comparative Study of Cepstcal Lifters and Distance Measures For All Pole Models of Speech Noise" (Feb., 1989 pp. 476–479) by Jean-Claude Junqua and Hisashi Wakita.

Hataoka et al., "VCV Segmentation and Phoneme Recognition in Continuous Speech," IEEE ICASSP 86, Tokyo, 1986, pp. 2299–2302.

*Primary Examiner*—David D. Knepper
*Attorney, Agent, or Firm*—Robert L. Troike; Richard L. Donaldson

[57] ABSTRACT

System (100) receives a speech signal at an input (102) which is measured and transformed by speech feature measuring device (104). The output feature vector from speech feature measuring device (104) is then compared to a reference model in a statistical classification manner. Acoustic similarity measuring device (106) performs statistical measurements while temporal speech model constraints block (108) imposes transitional probabilities to the probability measurements generated by measuring device (106). Acoustic similarity measuring device (106) performs a weighted analysis of the error vector defined between the speech feature vector and reference vector utilized during the analysis.

11 Claims, 1 Drawing Sheet

SPEECH ANALYSIS METHOD AND APPARATUS

CROSS REFERENCE TO RELATED APPLICATIONS

This application is a continuation of U.S. patent application Ser. No. 07/916,796 filed Jul. 17, 1992, entitled "Speech Analysis Method and Apparatus" by George R. Doddington, now abandoned, which is a continuation of U.S. patent application Ser. No. 07/505,085 filed Apr. 4, 1990, entitled "Speech Analysis Method and Apparatus" by George R. Doddington, now abandoned.

TECHNICAL FIELD OF THE INVENTION

This invention relates in general to speech technology and more particularly to an improved method and apparatus for speech analysis.

BACKGROUND OF THE INVENTION

The development of good acoustic features for improving the performance of speech analysis has dominated the overall speech analysis effort since the beginning attempts at automatic speech recognition and speaker verification in the 1950's. Through this effort, the short-term amplitude spectrum as a function of time has become the universally accepted measure upon which virtually all successful speech recognizers are currently based. Given this general measure, usually expressed as a spectral amplitude vector sampled uniformly in time, there have been many and various efforts to perform linear and non-linear transformations of the basic measure into forms that yield improved speech analysis performance.

Many current systems employ a linear transformation of the spectral vector which is explicitly designed to yield uncorrelated features. These features are then scaled so that each exhibits equal variance under model conditions. The resultant transformed features are called orthonormal. These orthonormal features, along with a Euclidean distance measure, provide a maximum likelihood recognition answer under typical multivariate Gaussian models. However, even under multivariate Gaussian analysis, these systems still yield a number of errors in speech analysis. These errors most likely result from the inaccuracies of applying a multivariate Gaussian model to the speech measurements.

Therefore, there has arisen a need for a speech analysis method and apparatus which provides a more accurate measurement in performing speech analysis.

SUMMARY OF THE INVENTION

In accordance with the present invention, a speech analysis method and apparatus are provided which substantially eliminate or prevent disadvantages and problems associated with prior speech analysis systems.

The present invention includes both apparatus and methodology for improving speech analysis. For example, the speech analysis method of the present invention comprises the steps of receiving a feature vector having a plurality of elements, providing a reference model vector, and generating selected elements of the square of an error vector corresponding to the feature vector element. Selected elements of the error vector are weighted by a weight factor comprising a factor proportional to the relative variance of the respective selected element.

The present invention provides several technical advantages over prior art devices. The weighted error vector provides improved recognition scoring over prior art speech analysis systems. In particular, a reduction in the number of recognition errors on the order of two has been observed when implementing the weighting feature of the present invention.

The present invention further includes the selective generation of the observation score such that feature elements having relatively high variances are eliminated from consideration. Accordingly, there is the technical advantage that processor time and calculations are minimized. Further, there is the technical advantage that the need for memory otherwise required for additional computations is eliminated. Additionally, the selective elimination yields the technical advantage of a lesser number of errors in the recognition process.

BRIEF DESCRIPTION OF THE DRAWINGS

For a more complete understanding of the present invention, and the advantages thereof, reference is now made to the following description taken in conjunction with the accompanying drawings, in which.

DETAILED DESCRIPTION OF THE INVENTION

Figure 1:
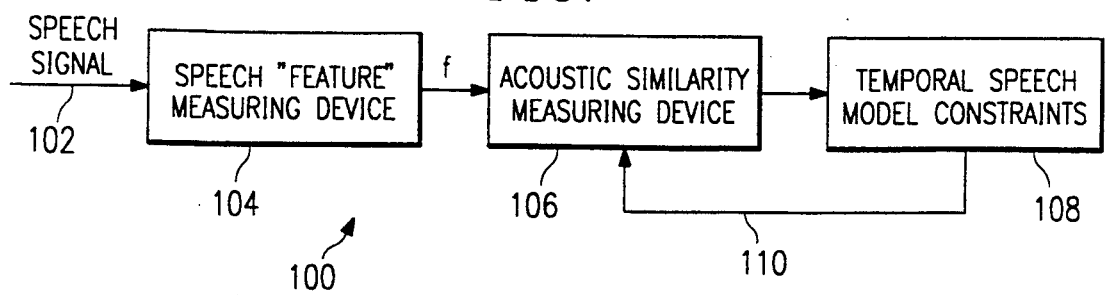
FIG 1 illustrates a block diagram of a speech recognizer system.
Figure 2:
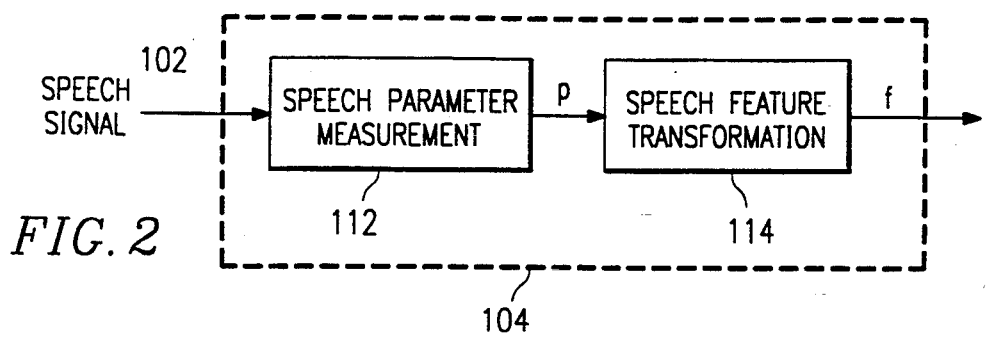
FIG. 2 illustrates, in block diagram form, the componentry of speech feature measuring device illustrated in FIG. 1.
Figure 3:
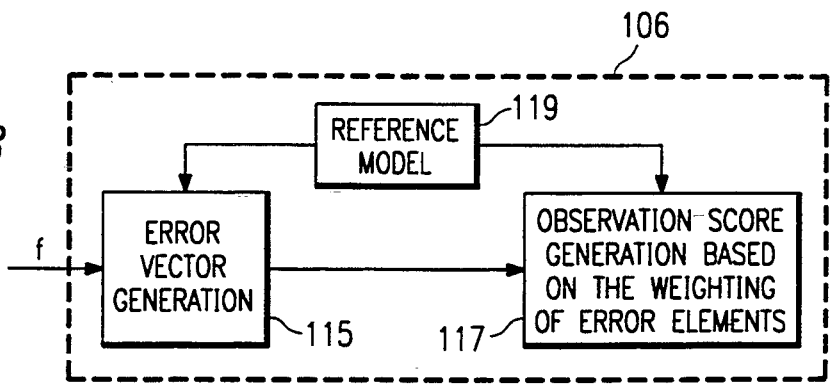
FIG. 3 illustrates, in block diagram form, components of the acoustic similarity measuring device illustrated in FIG. 1.

The preferred embodiment of the present invention is best understood by referring to FIGS. 1-3 of the drawings, like numerals being used for like and corresponding parts of the various drawings.

FIG. 1 illustrates a speech analysis system designated generally at 100. Speech analysis system 100 may be used in various types of speech analysis. For example, system 100 may be used to perform various speech analysis operations including, but not limited to, speech recognition and speaker verification. Speech analysis system 100 includes an input 102 for receiving a speech signal. Input 102 is connected to a speech "feature" measuring device 104. Speech feature measuring device 104 provides a sequence of feature vectors, $f_j$, periodically to an acoustic similarity measuring device 106. Acoustic similarity measuring device 106 interacts with a temporal speech model constraints block 108. In general, the analysis performed by speech analysis system 100 occurs over a period of time. Acoustic similarity measuring device 106 performs statistical analysis on the feature vector for a set of predetermined speech model characterization periods known as "states". Temporal speech model constraints block 108 accounts for the transition between these states by imposing statistical limitations on the transitions between states of the model. Temporal speech model constraints block 108 communicates these limitations to acoustic similarity measuring device 106 by a feedback control line 110. It should be noted that system 100 is applicable to any standard speech recognition/speaker verification structures. The two most popular are known as DTW (dynamic time warping) and HMM (hidden Markov Model).

Speech analysis system 100 comprises a statistical classification system utilized to analyze speech data. In particular, the overall operation of speech analysis system 100 is as follows. Speech feature measuring device 104 receives a speech signal from its input 102. The speech signal is then measured or calibrated over a given period of time, known as a frame. Typically, the frame is on the order of 10 to 20 milliseconds. The resultant frame measurement is in the form of a vector known as a speech "feature" (hereinafter denoted "f"). The speech feature vector is a vector having anywhere from 2–200 numerical elements therein. In the preferred embodiment, the speech feature vector includes 10–20 elements. Each element within the speech feature vector generally reflects the amplitude of the speech signal as a function of frequency (i.e., a spectral amplitude representation). The particular element may reflect either the static amplitude of the speech signal at a predetermined time during the frame or alternatively, may reflect the dynamics of that amplitude, that is, the amplitude difference over a few frame periods. Numerous types of coefficients as known in the art may be used to modify the signal amplitude representations within the speech feature vector. Thus, each speech feature vector may include a number of different amplitude representations for a discrete point in time.

Each speech feature vector, f, is received by acoustic similarity measuring device 106. Acoustic similarity measuring device 106 then compares the speech feature versus a predetermined statistical "reference" model. The comparison is manifested in the form of probability determination that a predetermined state of the statistical model underlies the speech feature vector. This probability determination is known as an "observation score". The observation score is generated for a particular "state" of the model, as discussed in more detail below. In essence, the speech signal received by system 100 is explained with respect to the statistical model that is provided to identify the speech signal. In particular, the statistical process is carried forth in order to determine the most probable and thus the best "path" of the sequence of speech features through the predetermined model of the data. For example, system 100 may provide a speech recognition model to explain utterances of numerical digits (e.g. "one", "two", "three", etc.). Thus, the model will represent in general numerical digits, and will include paths through the model representing likely speech inputs (e.g. path for "one", path for "two", etc.). Each path is further broken down into "states", which are model characterizations of the acoustics over a part of the path (e.g. sound "n" in "one", or sound "t" in "two"). An observation score is generated for each state to determine the probability of the feature vector frame given the particular model reference state.

Temporal speech model constraints block 108 interacts with acoustics similarity measuring device 106 in order to process a series of frames. Thus, temporal speech model constraints block 108 imposes considerations of state transitions as represented by the underlying statistical reference model. Temporal speech model constraints block 108 generates transition probabilities. These transition probabilities reflect the probability that one model state follows another for successive input frames. If the speech signal, when compared against the reference model, results in a state probability above a predetermined threshold, then block 108 provides a control signal via control line 110 to acoustic similarity measuring device 106 to compute the observation score for that state.

For example, consider the above-discussed example of analyzing numerical digits. Further, assume the speech signal received at input 102 is the word, "six". As the utterance of the word "six" is received, speech feature measuring device 104 begins generating speech feature vectors as discussed above. As each feature vector is received, acoustic similarity measuring device 106 compares the feature vector against paths through the reference model in order to generate appropriate probabilities of the feature given each reference model path. As frames are received corresponding to the initial sound "s", acoustic similarity measuring device 106 will yield high probabilities that the speech signal may represent either the model path for "six", or the model path for "seven" due to the initial consonant sound and its corresponding representative speech features. As time and analysis continue, the "i" component of the input signal "six" will be processed. At this instant, temporal speech model constraints 108 will then generate transitional probabilities based on the speech signal versus the reference paths for "six" and "seven". For the former reference, a transition from "s" to "i" will yield a high transition probability. However, the reference model path for "s" to "e" will yield a lesser probability. If this probability is below a predetermined threshold, then temporal speech model constraint block 108 will control acoustic similarity measuring device 106 to stop any further comparison of the path for "seven" to the speech signal.

A more detailed description of the operation of speech analysis system 100 is as follows. However, before proceeding, it should be noted that the various computations and data management discussed herein may be implemented in any one of a multitude of processor/memory systems known in the art.

FIG. 2 illustrates a block diagram of the components of speech feature measuring device 104 shown in FIG. 1. Input 102 is connected to a speech parameter measurement block 112. Speech parameter measurement block 112 is connected to speech feature transformation block 114 which provides the feature vector discussed above.

The operation of the components within speech feature measuring device 104 is as follows. Speech parameter measurement block 112 receives the speech signal via input 102. For a predetermined frame of time, typically on the order of 10 to 20 milliseconds, speech parameter measurement block 112 generates a parameter vector, p. In the preferred embodiment, parameter vector p contains 10–40 elements wherein each element typically corresponds to either a static or dynamic acoustic amplitude measurement at a predetermined frequency. Thus the entire parameter vector p represents numerous measurements made on for the speech signal during the frame time period. Parameter vector p is output from speech parameter measurement block 112 to speech feature transformation block 114. The parameter vector, p, is thereafter modeled as a continuous random vector. More particularly, the parameters are assumed to be distributed as a multivariate Guassian distribution. Thus, $$p \approx N(m_{pr}, C_{pr}) \qquad 1$$

where, $m_{pr}$ is the mean value of the parameter vector element, $C_{pr}$ is the covariance matrix of the parameter vector element, and r is the model state which generated p.

Speech feature transformation block 114 performs a global transformation on parameter vector, p, under a pooled covariance model. By definition, a pooled covariance model assumes that all model states, r, have the same covariance matrix, $C_{pr}$. Each transformation of a parameter vector, p, results in a corresponding feature vector, f, as defined by $$f = Tp \qquad 2$$

where,

T is the global transformation matrix based on the pooled covariance model. The global transformation resulting from equation 2 rotates and scales each parameter vector. In particular, the global transformation provides a feature vector with an identity covariance matrix, i.e., having uncorrelated elements and unity variance. As a result, the feature vectors are distributed as multivariate Guassian with mean, $m_{fr}$ and covariance, $C_{fr}$ of one. Thus, the feature vectors may be represented as:

$$f \approx N(m_{fr}, C_{fr} = I) \qquad 3$$

where, $m_{fr}$ is the mean value of the feature vector element, $C_{fr}$ is the pooled covariance matrix of the feature vector, r is the model state which generated f, and I is the identity matrix which is the resultant covariance following the above-noted transformation discussed in connection with Equation 2.

Speech feature transformation block 114 then passes each speech feature vector, f, to acoustic similarity measuring device 106 as illustrated in FIG. 1.

Upon receipt of a speech feature vector, f, acoustic similarity measuring device 106 will commence analysis of that feature vector with respect to a reference model state. In particular, acoustic similarity measuring device 106 generates the probability (i.e. observation score) that the incoming speech feature vector is explained given a state reference vector, r. Under multivariate Guassian distribution, the probability density function (PDF) may be defined as:

$$PDF = (2\pi)^{-\frac{1}{2}} |det\, C_{fr}|^{-\frac{1}{2}} exp[-\frac{1}{2}(f^T - m_{fr}{}^T)C_{fr}^{-1}(f - m_{fr})] \qquad 4$$

where, $C_{fr}$ is the full covariance matrix of the feature vector for the particular state of the reference model, f is the feature vector, and $m_{fr}$ is the mean value of f for the state r of the reference model.

For purposes of computational efficiency, the probability density function may be expressed in texans of a log probability. Accordingly, taking the natural logarithm of Equation 4 results in:

$$\log(PDF) = -\frac{1}{2}(f^T - m_{fr}{}^T)C_{fr}^{-1}(f - m_{fr}) + \log[(2\pi)^{-\frac{1}{2}}|detC_{fr}|^{-\frac{1}{2}}] \qquad 5$$

where, $-\frac{1}{2}(f^T - m_{fr}{}^T)C_{fr}^{-1}(f - m_{fr})$ is the quadratic factor of the log probability, and $\log[(2\pi)^{-\frac{1}{2}}|detC_{fr}|^{-\frac{1}{2}}]$ is defined as a covariance dispersion factor "$CDF_{fr}$".

The reference covariance matrix, $C_{fr}$, is a positive, definite symmetric matrix. Accordingly, the inverse of the matrix may be transformed as:

$$C_{fr}^{-1} = T_r{}^T T_r \qquad 6$$

where, $T_r$ may be further defined as:

$$T_r = S_{fr} U_{fr} \qquad 7$$

where, $S_{fr}$ is a diagonal matrix of scale factors, wherein each scale factor is the reciprocal of the square root of the eigenvalue of covariance matrix, $C_{fr}$, and $U_{fr}$ is a unitary matrix containing the eigenvectors for covariance matrix, $C_{fr}$.

Substituting Equation 7 into Equation 5 results in:

$$\log(PDF) = -\frac{1}{2}(f - m_{fr})^T U_{fr}{}^T (S_{fr})^T S_{fr} U_{fr}(f - m_{fr}) + CDF_{fr} \qquad 8.$$

The scale factor matrix, $S_{fr}$, is a diagonal matrix and, therefore, the transpose of that matrix is equal to itself. Thus, an error vector, $E_{fr}$ may be defined as:

$$E_{fr} = S_{fr} U_{fr}(f - m_{fr}) \qquad 9$$

Substituting Equation 9 into Equation 8 yields a simplified version of the log probability density function which is:

$$\log(PDF) = -\frac{1}{2} E_{fr}{}^T E_{fr} + CDF_{fr} \qquad 10$$

Thus, from Equation 10, it may be appreciated that the log of the probability density function may be represented as a scale factor (i.e., $-\frac{1}{2}$), times a Euclidean distance represented by the error vector, $E_{fr}$, plus the covariance dispersion factor. The observation score is defined as the logarithm of the probability density function summed over all elements of the feature vector. Thus, the observation score is:

$$\text{observation score} = -\frac{1}{2} \sum_{i=1}^{n} E_{fri}^2 + CDF_{fr} \qquad \text{Eqn. 11}$$

where, n is the number of elements in the feature vector.

As shown in FIG. 3, acoustic similarity measuring device 106 includes block 115 for generating the error vectors. The reference model is also known at block 119.

The solution of Equation 11 has heretofore been recognized as representing an accurate method by which to compare speech feature vectors to a reference model. However, under the present invention, it has been discovered that more optimal results may be used by weighting each squared error factor, $E_{fr}^2$, prior to the summation as shown in Equation 11. In particular, more accurate results may be obtained wherein each squared error factor is weighted by a function of the state-specific variance (i.e., the eigenvalue) to the pooled covariance variance (i.e. 1). Accordingly, an improved observation score may be determined by:

$$\text{overall } \log(PDF) = -\tfrac{1}{2} \sum_{i=1}^{n} (W_{fri}E_{fri})^2 + CDF_{fr} \quad \text{Eqn. 12}$$

where, $W_{fri}$ is the weighting factor for element i of feature vector f generated for state r, and where $W_{fri}$ is a function of the variance of feature vector element i for state r relative to its pooled variance.

As shown in FIG. 3, the improved observation score, based on the weighting factors, is generated at block 117. Typically, $W_{fri}$ may be defined as:

$$W_{fri} = S_{fri}^{-x} \quad 13$$

where, $S_{fri}$ is the ith element of $S_{fr}$ defined in relation to Equation 7, above, and x is an exponent which in the preferred embodiment is in the range between zero and one as discussed below.

From Equation 12, it may appreciated that each error factor, $E_{fri2}$, may be weighted by a function of the relative variance factor. This factor represents the relative variance of the feature after transformation by the pooled covariance transformation. This is the ratio of the full covariance model variance to the pooled covariance model variance, for each eigenvector.

Figure 4:
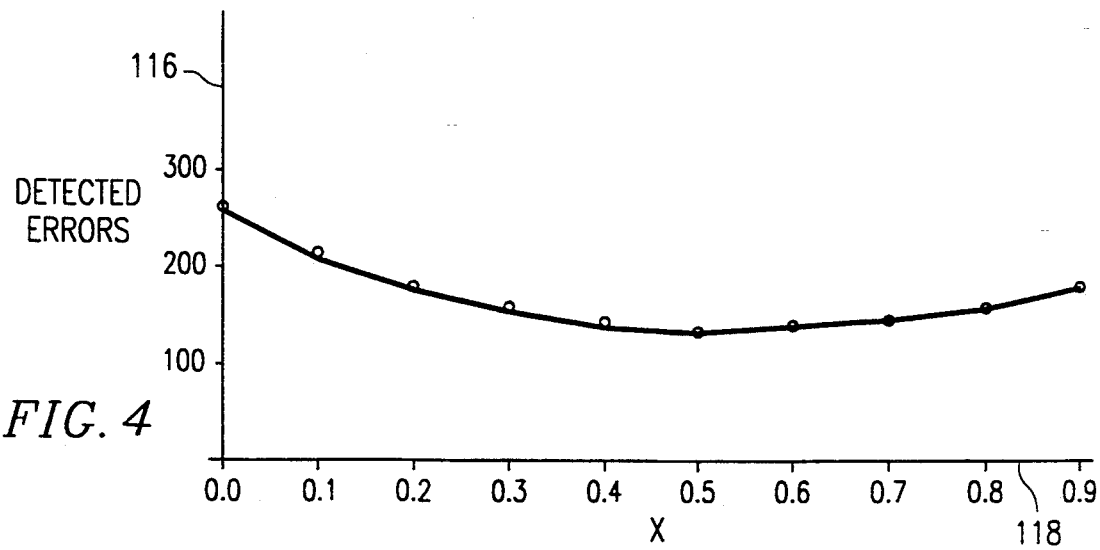
FIG. 4 illustrates a graph depicting the reduced number of speech analysis errors resulting from the weighting feature of the present invention compared to prior art analysis.

FIG. 4 illustrates a graph of the improved results obtained by the present invention. In particular, the graph of FIG. 4 includes a vertical axis 116 denoting the number of speech analysis errors detected and a horizontal axis 118 denoting the exponent, x, of the weighting factor in accordance with the following equation:

$$\text{observation score} = -\tfrac{1}{2} \sum_{i=1}^{n} (S_{fri}^{-x} E_{fri})^2 + CDF_{fr} \quad \text{Eqn. 14}$$

From the graph illustrated in FIG. 4, it may appreciated that with no weighting factor (i.e., x=0), the total number of errors detected is on the order of 260. This is the result under prior art calculations pursuant to Equation 11. Under the present invention, optimal results are attained where x=½. At the point where exponent x=½, the graph illustrates that less than 140 errors were detected. As a result, the use of a weighting factor at an exponent of ½ results in an error reduction by an approximate factor of two. While a coefficient of ½ provides optimal results, FIG. 3 further illustrates that a coefficient ranging between 0 and 1 results in improved performance over the prior art solution wherein no weighting factor was utilized.

In another aspect of the present invention, it has been discovered that more precise observation scores may be determined by eliminating selected elements otherwise included within the summation of Equation 14. In particular, more accurate observation scores may be generated by eliminating feature elements having relatively high variances (i.e., or eigenvalues) from the summation of Equation 14.

For example, in the preferred embodiment, feature vectors having eighteen elements were utilized to determine observation scores. Thus, in accordance with Equation 14, eighteen products were calculated and summed together. However, it has been empirically determined that elimination of the four feature vector elements having the highest variance with respect to the remaining fourteen feature elements resulted in a more accurate observation score. Thus, only fourteen products corresponding to the fourteen feature vector elements having relatively lower variances were summed. The resultant observation score produced significantly fewer errors than compared with a full summation over all feature vector elements. It should be further noted that the removal of these elements requires fewer calculations and less memory.

Although the present invention has been described in detail, it should be understood that various changes, substitutions and alterations can be made herein without departing from the spirit and scope of the invention as defined by the appended claims. In particular, while the discussion herein has been with particular reference to speech recognition, the same principles may be applied by one skilled in the art to speaker verification in order to achieve similar improved results.

What is claimed is:

1. A method of speech analysis comprising:
   receiving a speech signal;
   converting the speech signal into a converted signal for processing by a processor and memory system;
   generating a feature vector from said converted signal, said feature vector having a plurality of feature vector elements;
   providing a reference model comprising a plurality of states, each of said states comprising an associated means vector and covariance matrix;
   generating an error vector having a plurality of error elements, each of said error elements corresponding to one of said feature vector elements;
   weighting each of said error elements by a respective weight factor raised by an exponent, each respective weight factor comprising a factor proportional to a relative variance of each of said feature vector elements;
   generating an observation score based on said feature vector, said weighted error elements, and said reference model states; and
   based on a series of said observation scores, determining the probability that received speech signals correspond to a particular series of said reference model states.

2. The method of claim 1 wherein said step of weighting said error elements comprises weighting only said error elements corresponding to said feature vector elements having variances below a predetermined value.

3. The method of claim 1 wherein the error vector is defined as a product of a diagonal matrix of scale factors, wherein each scale factor is a reciprocal of a square root of an eigenvalue of said covariance matrix, times an eigenvector matrix associated with said reference model, times a difference between the feature vector and said mean vector.

4. The method of claim 1, wherein said exponent is in a range of zero to negative one.

5. The method of claim 1 wherein said exponent is negative one-half.

6. The method of claim 1 wherein said weighting step yields a plurality of partial results, and said step of generating an observation score further comprises:
   squaring the partial results;
   summing the squared partial results;

multiplying the summed, squared partial results times negative one-half; and adding a covariance dispersion factor to the multiplied, summed, squared partial results.

7. An apparatus for performing speech analysis, comprising:

circuitry for receiving a speech signal;

circuitry for converting said speech signal to a converted signal for processing by a processor and memory system;

circuitry for transmitting said converted signal to speech feature measuring circuitry;

said speech feature measuring circuitry for generating a feature vector from said converted signal, said feature vector having a plurality of feature vector elements;

a memory for storing a reference model comprising a plurality of states, each of said states comprising an associated mean vector and covariance matrix;

acoustic similarity measuring circuitry, including:

circuitry for generating an error vector having a plurality of error elements, each of said error elements corresponding to one of said feature vector elements;

circuitry for weighting each of said error elements of the error vector by a respective weight factor raised by an exponent, each respective weight factor comprising a factor proportional to a relative variance of each of said feature vector elements;

circuitry for generating an observation score based on said feature vector, said weighted error elements, and said reference model states; and circuitry for determining, based on a series of said observation scores, the probability that received speech signals correspond to a particular series of said reference model states.

8. The apparatus of claim 7 wherein said circuitry for weighting said error elements comprises circuitry for weighting only said error elements corresponding to said feature vector elements having variances below a predetermined value.

9. The apparatus of claim 7 wherein said error vector is defined as a diagonal matrix of scale factors, wherein each scale factor is a reciprocal of a square root of an eigenvalue of said covariance matrix, times selected elements of an eigenvector matrix associated with said reference model, time corresponding selected elements of a difference between said feature vector and said mean vector.

10. The apparatus of claim 7 wherein said exponent is in a range of zero to negative one.

11. The apparatus of claim 7 wherein said exponent is negative one-half.

* * * * *